United States Patent
Ansari et al.

(10) Patent No.: US 12,228,333 B2
(45) Date of Patent: Feb. 18, 2025

(54) SYSTEM FOR TRANSFERRING CONDENSATE

(71) Applicant: Saudi Arabian Oil Company, Dhahran (SA)

(72) Inventors: Nisar Ahmad Ansari, Ras Tanura (SA); Mohamed Soliman, Ras Tanura (SA); Samusideen Adewale Salu, Ras Tanura (SA); Talal Al-Zahrani, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 658 days.

(21) Appl. No.: 17/342,024

(22) Filed: Jun. 8, 2021

(65) Prior Publication Data
US 2022/0390171 A1    Dec. 8, 2022

(51) Int. Cl.
*B01D 5/00* (2006.01)
*F25J 1/02* (2006.01)

(52) U.S. Cl.
CPC ............ *F25J 1/0292* (2013.01); *B01D 5/009* (2013.01); *F25J 2220/68* (2013.01); *F25J 2230/30* (2013.01)

(58) Field of Classification Search
CPC .................................................... B01D 5/009
See application file for complete search history.

(56) References Cited

U.S. PATENT DOCUMENTS

| | | | |
|---|---|---|---|
| 6,829,906 B2 | 12/2004 | Beam | |
| 8,535,417 B2 | 9/2013 | Shah | |
| 9,249,996 B2 | 2/2016 | Stallmann et al. | |
| 10,473,109 B2 | 11/2019 | Gallinelli et al. | |

(Continued)

FOREIGN PATENT DOCUMENTS

CA    3005192 A1 * 12/2018    ............... C02F 9/00

OTHER PUBLICATIONS

Mutaz A. Daas et al., "Downhole Chemical Injection Through Gas Lift: Options and Consequences", SPE-142951, OnePetro, 2011, 3 pages.

(Continued)

*Primary Examiner* — Ellen M Mcavoy
*Assistant Examiner* — Ming Cheung Po
(74) *Attorney, Agent, or Firm* — Bracewell LLP; Constance G. Rhebergen; Keith R. Derrington

(57) ABSTRACT

While operating a compressor system equipped with compression train(s), condensate is collected from within stages of the compression train(s), and directed to a blowdown system. Gas from a later stage of the compression train is routed to the blowdown system and used to drive the condensate to a condensate destination at a pressure that avoids flashing of the condensate until it reaches the condensate destination. Inside the blowdown system the condensate is stored in a tank and directed to parallel piped vessels. Operation of the vessels includes (1) receiving the condensate, (2) pressurization with gas from a later stage of compression, (3) flowing the pressurized condensate from the vessel to the condensation destination, (4) depressurizing the vessel, and (5) repeating steps (1)-(4). A flow of condensate from the blowdown system is continuous by staggering the phases of operation between the two vessels.

20 Claims, 5 Drawing Sheets

(56) References Cited

U.S. PATENT DOCUMENTS

2006/0213221 A1    9/2006  Lee et al.
2018/0066194 A1*   3/2018  Soliman ................ C10G 31/06

OTHER PUBLICATIONS

Forbes Marshall, "Steam Operated Condensate Pump—SEG", www.forbesmarshall.com, Dec. 13, 2017, 1 page.

Spirax Sarco, "Spirax Sarco Ogden Automatic Pump Installation and Maintennace Instructions", IM-PO15-12, St Issue 3, 1998, 24 pages.

TLV—A Team Specialist Company (USA), "Pump Opertaion: Discharge Cycle", Power Trap, www.tlv.com, Dec. 13, 2017, 2 pages.

\* cited by examiner

SYSTEM FOR TRANSFERRING CONDENSATE

BACKGROUND

1. Field

The present disclosure relates to a system and method for transferring condensate collected from a process by driving the condensate with higher pressure fluids that are within the process.

2. Related Art

Gas handling and compression processes typically have multiple stages of compression that involve different compressors that sequentially raise pressure of gas being handled. The sequentially located compressors are often referred to in the whole as a compression train. Typically the compressors making up the compression train include an atmospheric compressor, a low pressure compressor, and high pressure compressor. The design of each stage of compression takes into account suction pressure available at each stage, and destination requirements; either at the next stage or at the terminal location where the gas exiting the train is being transmitted. Each stage of compression also usually employs a way to remove condensate from within the process gas, otherwise cavitation of blades in the compressor could occur if condensate were allowed to enter into a compressor.

Separation techniques to remove the condensate from the process gas often involve a separator or knock out drum ("KOD") that allows the heavier condensate to fall out of the gas stream and collect in the bottom of the drum. After removing the condensate from the gas stream, the gas flows out the top of the drum and to the next stage of compression. A KOD is usually provided upstream and also downstream of each compression stage. After coolers are also typically provided downstream of each compressor, which promotes condensate formation of the gas before it enters the discharge KOD. Traditionally dedicated pumps are used to remove the condensate from each KOD, which can be costly, require maintenance, and involves operational expenses.

SUMMARY

Disclosed is an example of a method of operating a compressor system having multiple stages of compression where the method includes receiving condensate collected from a first area in the compressor system, directing the condensate to a blowdown system, obtaining gas from a second area in the compressor system that is downstream of the first area and at a pressure greater than a pressure of the first area, forming pressurized condensate in the blowdown system that is at a designated pressure by combining the gas from the second area with the condensate in the blowdown system, and flowing the pressurized condensate from the blowdown system to a condensate destination. In an example, the blowdown system includes vessels in which the condensate is pressurized and then flows from the vessels to the condensate destination, the method further includes depressurizing the vessels after the condensate flows from the vessels. In an alternative, depressurizing the vessels involves flowing the gas from the vessels to the first area, involves flowing the gas from the vessels to one or more of stages of compression between the first area and the second area, or optionally flowing the gas from the vessels to a stage that is upstream of the first area. In an embodiment operational phases of vessels are staggered, so that while one of the vessels is receiving condensate, condensate is flowing from another one of the vessels and so that pressurized condensate flow to the condensate destination is substantially continuous. In an example, the designated pressure exceeds a saturation pressure of the condensate by an amount at least as great as dynamic and static pressure losses experienced by the condensate when flowing from the vessel to the condensate destination. The method optionally further includes combining condensate from the second area of compression with the pressurized condensate at a location upstream of the condensate destination. In one example, the first area is a first knockout drum disposed upstream of a first compressor, and the second area is a second knockout drum disposed downstream of the first compressor. The method further optionally includes collecting hydrocarbon condensate from a third area in the compression system, and where the hydrocarbon condensate collected from the third area includes hydrocarbons from a process stream being pressurized in the multiple stages of compression. In this example, the blowdown system is a first blowdown system, and the method further includes directing the hydrocarbon condensate to a second blowdown system, forming pressurized hydrocarbon condensate by directing gas to the second blowdown system that is from a stage in the compressor system having a pressure greater than the third area. In an alternative, the method further includes directing gas from the second blowdown system to the first area. In an alternative, the method further includes separating water condensate from the hydrocarbon condensate, and directing the water condensate to a water condensate destination. Optionally, the method further includes collecting an additional amount of water condensate from a suction line of a compressor upstream of the third area, and combining the water condensate with the additional amount of water condensate at a location upstream of the water condensate destination.

An alternative method of operating a compressor system having multiple stages of compression is disclosed and that includes collecting condensate from an early stage of the compressor system, pressurizing the condensate in a blowdown system with gas from a later stage of the compressor system, and flowing the pressurized condensate from the blowdown system to a condensate destination. This method further optionally includes flowing the gas to the early stage. In one example of the blowdown system includes first and second vessels piped in parallel and the method further includes: (a) venting gas from the first vessel, flowing the condensate into the first vessel, and pressurizing the first vessel with the gas while condensate is flowing from the second vessel, (b) venting gas from the second vessel, flowing the condensate into the second vessel, and pressurizing the second vessel with the gas while condensate is flowing from the first vessel, and (c) repeating steps (a) and (b) so that a flow of condensate to the condensate destination is substantially continuous. The condensate is optionally pressurized to a designated pressure so that the condensate remains in the liquid state while flowing to the condensate destination. In another alternative, the method further includes flowing gas from a downstream blowdown system to the early stage, and optionally hydrocarbon condensate is directed to the downstream blowdown system.

BRIEF DESCRIPTION OF DRAWINGS

Some of the features and benefits of that in the present disclosure having been stated, others will become apparent as the description proceeds when taken in conjunction with the accompanying drawings, in which.

Figure 1:
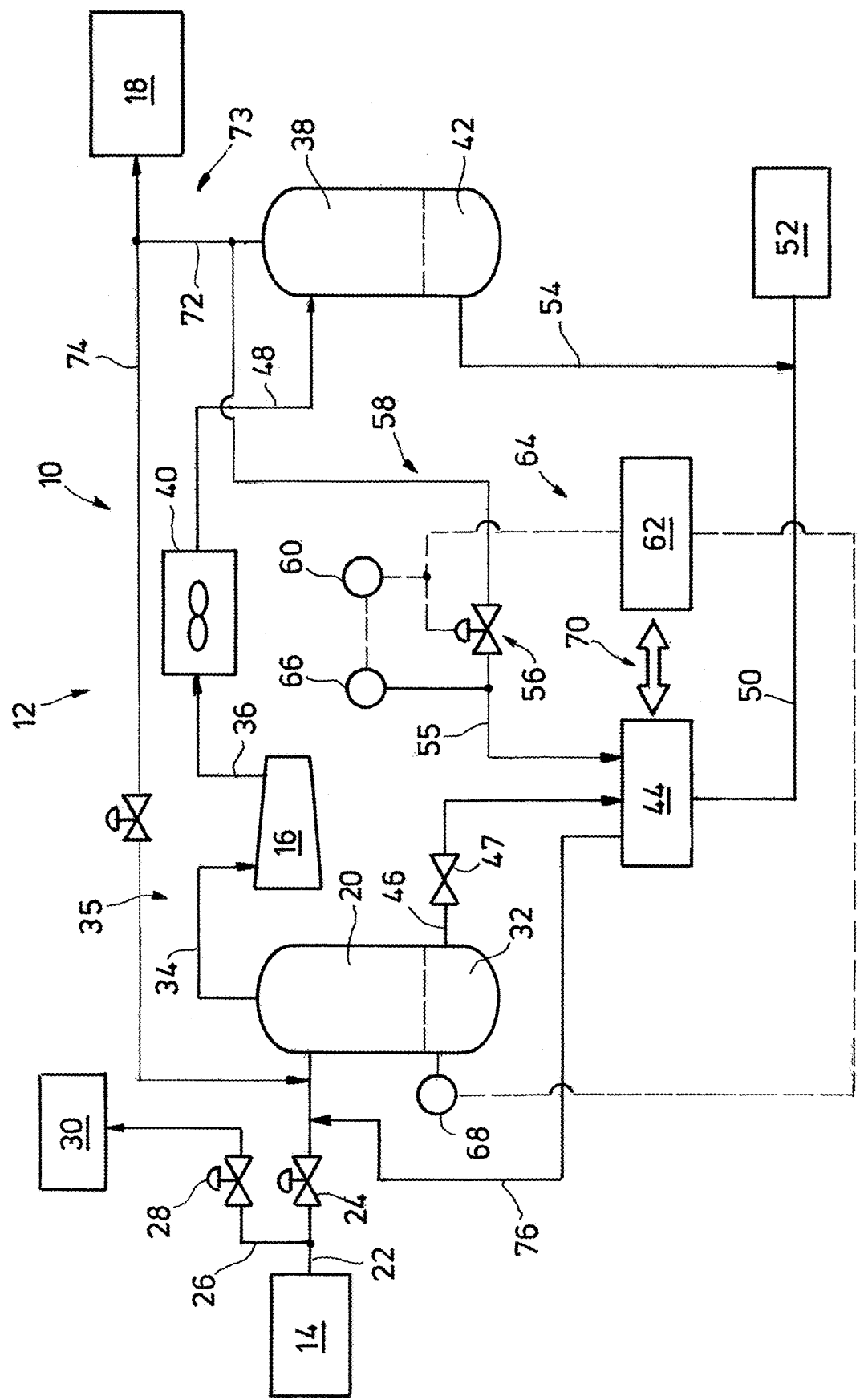
FIG. 1 is a schematic of a stage in a compression system having an example condensate blowdown system.

While that disclosed will be described in connection with embodiments, it will be understood that it is not intended to limit embodiments described. On the contrary, it is intended to cover all alternatives, modifications, and equivalents, as may be included within the spirit and scope of that described.

DETAILED DESCRIPTION

The method and system of the present disclosure will now be described more fully with reference to the accompanying drawings in which embodiments are shown. The method and system of the present disclosure may be in many different forms and should not be construed as limited to the illustrated embodiments set forth; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a flow diagram of one example of a first stage 10 that is part of a compression system 12. In an example compression system 12 includes a number of stages of compression (in addition to the first stage 10) that each handle the same process flow and sequentially compress and pressurize gas within the process flow. For the purposes of discussion herein, the terms process flow, process stream, and gas stream refer to a flow of gas or vapor flowing through and being handled by the compression system 12. In examples the stages of compression of the compression system 12 are referred to as a compression train. In the example of FIG. 1, the process flow is delivered to the compression system 12 from a gas source 14 and an atmospheric compressor 16 pressurizes the process stream or gas from gas source 14 and for delivery to a compressed gas destination 18. An atmospheric compressor suction knockout ("KO") drum 20 and which is shown connected to the gas source 14 through an inlet line 22. A control valve 24 is in inlet line 22 and downstream of an offsite line 26 that branches from inlet line 22. Included in offsite line 26 is a control valve 28, which in an example use controls a flow of the gas from gas source 14 to a flare or recovery 30. Similarly, control valve 24 regulates the amount of gas or process stream flowing into the AC suction KO drum 20. In the illustrated example condensate 32 is shown collecting in a lower or bottom portion of the AC suction KO drum 20. Shown is an AC suction line 34 that extends from an overhead of the AC suction KO drum 20 and to a suction side of the atmospheric compressor 16. In the example of FIG. 1, drum 20 and line 34 are included in a first area 35. A downstream or discharge end of atmospheric compressor 16 connects to a AC discharge line 36 shown having a terminal end connected to an inlet of an AC discharge KO drum 38. Optionally, an after cooler 40 is included in line 36 for cooling the gas or process stream flowing within line 36. An amount of condensate 42 is also schematically illustrated and collecting within a bottom or lower end of the AC discharge KO drum 38.

Included with the example system 12 of FIG. 1 is a blowdown system 44, in which condensate 32 is pressurized for delivery to an offsite location. In this example, a condensate drain line 46 provides a conduit for communicating condensate 32 from the AC suction KO drum 20 to the blowdown system 44. An optional block valve 47 is included in line 46 for controlling the flow of condensate 32 through line 46. Pressurized condensate exits the blowdown system 44 through a condensate transfer line 50 that carries the pressurized condensate to a condensate destination 52. In examples, the condensate destination 52 is within the same facility as the compression system 12 or at a location distal which in examples exceeds multiple hundreds of yards, as well as multiple miles. A return line 48 is shown providing communication from an overhead of the AC discharge knockout drum 38 and an inlet to the blowdown system 44. Condensate 42 from drum 38 is optionally delivered to transfer line 50 via drain line 54 shown connecting to a lower end of the drum 38. In the example of FIG. 1, the drain line 54 intersects the condensate transfer line 50 at a location that is upstream of the condensate destination 52. In a non-limiting example of use, condensate 42 from drum 38 combines with pressurized condensate flowing from blowdown system 44 in line 50, and the combination flows to the condensate destination 52. In alternative, pressure of condensate 42 is equalized with pressure of pressurized condensate by introducing a pressure drop in line 54, such as with a control valve (not shown) or orifice (not shown); or by elevating blowdown system 44.

Line 55 is shown connected between an overhead of drum 38 and an inlet to blowdown system 44. A control valve 56 is shown in line 55 and which is operatively connected to a control system 58 for controlling operation of the control valve 56. Included in the control system 58 is a pressure controller 60 that is in signal communication with a master controller 62. A communication link 64 is schematically shown which in this example provides signal communication between the master controller 62, pressure controller 60; examples of communication include hardwire, fiber optics, radio signals, and telemetry. Also included in the example control system 58 of FIG. 1 is a pressure indicator 66 that is in pressure communication with line 55 downstream of control valve 56 and in signal communication with the pressure controller 60. As shown, control system 58 also includes a level transmitter 68 shown mounted onto an outer surface of AC suction KO drum 20 and in communication with master controller 62 via communication link 64. In the example of FIG. 1, master controller 62 is in communication with the blowdown system 44 via a telemetry link 70. In alternate examples, master controller 62 and blowdown system 44 are in communication via hardwire and/or software provided with the communication link 64. Gas within the AC discharge KO drum 38 makes its way to the compressed gas destination 18 via overhead line 72 shown branching from line 55. As shown, the drum 38 and line 72 make up a second area 73 of the compression system 12. An optional recycle line 74 is shown providing communication between line 72 and line 22 upstream of the inlet to drum 20. Included within line 74 is a control valve for regulating the flow of return gas through line 74.

In a non-limiting example of operation of the first stage 10 of FIG. 1, gas entering the AC suction KO drum 20 exits line 22 into drum 20 and condensate 32 from within the gas falls out of the process stream and collects in the lower portion of drum 20 as shown. Gas, without condensate, flows from drum 20 into AC suction line 34 to atmospheric compressor 16 where it is compressed and pressurized before being discharged into the AC discharge line 36. In one example, the pressure of the gas within the AC suction KO drum 20 ranges from about 0.5 psig to about 1.5 psig. In this example, the gas is pressurized within the atmospheric compressor 16 to a pressure that ranges from around 40 psig to about 50 psig. Pressurization of the process stream in combination with the cooler 40 causes condensate formation within the process stream and which due to gravity, the greater density condensate 42 falls from the process flow and collects in the bottom of drum 38. In response to signals generated from level transmitter 68 and transmitted to the controller 62 control valve 56 is selectively opened to provide a flow of gas from the overhead of drum 38 to the blowdown system 44 for driving the condensate 50 to the condensate destination 52. In one non-limiting example, the pressure of the gas provided downstream of control valve 56 is at a value so that the condensate 32 remains in a saturated or subcooled state the entire time while flowing through transfer line 50 and to the condensate destination 52.

Figure 2:
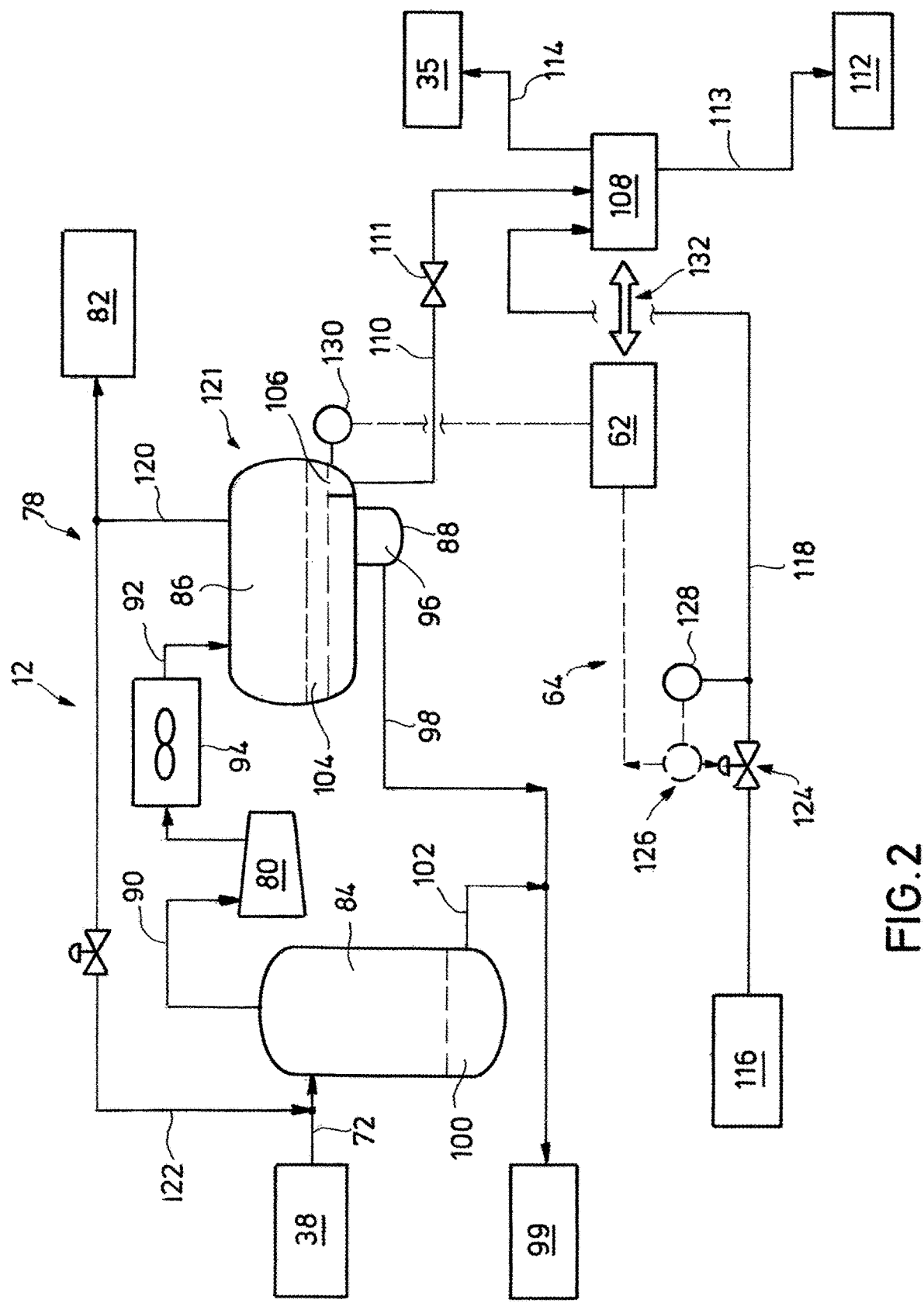
FIG. 2 is a schematic of a later stage of the compression system of FIG. 1 and having an example of a condensate blowdown system.

Shown in FIG. 2 is a schematic flow scheme example of a second stage 78 of the compression system 12 and which is downstream of or at a later stage of compression than the first stage 10 of FIG. 1. In the example of the second stage 78, a low pressure compressor 80 is shown which receives gas from the drum 38, and further pressurizes or compresses the gas for delivery to a compressed gas destination 82. In a non-limiting example of operation, the low pressure compressor 80 receives gas at a pressure of about 40 psig to about 50 psig, and compresses the gas to discharge pressures that range from about 140 psig to about 150 psig. Operational components of the second stage 78 include a low pressure compressor suction knockout drum 84 shown upstream of low pressure compressor 80. Downstream of compressor 80 is a low pressure compressor discharge knockout drum 86 and shown having a leg 88. Leg 88 is alternatively referred to as a boot, and is shown attached to a lower portion knockout drum 86; as discussed in more detail below, leg 88 provides a collection point for liquids condensed from the gas stream to drop from the process stream as it flows through knockout drum 86. The suction line 90 provides communication between drum 84 and an inlet or suction side of compressor 80 and a discharge line 92 provides communication for the process stream between compressor 80 and drum 86. An optional after cooler 94 is included within line 92, which in an example cools the gas stream flowing in line 92. In the example of FIG. 2, water condensate 96 falls from the gas stream flowing through drum 86 and collects within leg 88. In an alternative, water condensate 96 flows from leg 88 into line 98 where it is routed to a water condensate destination 99.

Also in the example of FIG. 2, water condensate 100 collects in the lower end of drum 84 and which is transported to line 98 from drum 84 via drain line 102 that connects to the drum 84. Also collecting in drum 86 is hydrocarbon condensate 104 which being lighter than the water condensate 96, and a weir 106 provides a means for separating these different condensates 96, 104. In the example of FIG. 2 condensate 104 is directed to blowdown system 108 through line 110. An optional block valve 111 is provided integrally within line 110 for regulating the flow of condensate 104 to blowdown system 108. Inside the blowdown system 108 the hydrocarbon condensate 104 is pressurized to form a pressurized condensate and then delivered to a process 112 via line 113. In examples, process 112 is part of a chemical processing facility, refinery, or other facility in which hydrocarbon fluids are being handled or processed. Further in the example of FIG. 2, line 114 is shown providing communication from an overhead of the blowdown system 108 and to the first area 35 (FIG. 1). An assist gas source 116 is shown in communication with the blowdown system 108 via line 118. In the example of FIG. 2, gas from the assist gas source 116 provides a pressurization source for increasing the pressure of condensate 104 within blowdown system 108 and provides a motive force for delivering condensate 104 to the condensate process 112. Similar as discussed above, the condensate 104 is pressurized to a designated pressure, which is a pressure above saturation pressure of the condensate 104 by an amount at least as great as expected static and dynamic pressure losses encountered by condensate 104 on its way to the condensate destination 112; and to a level that prevents flashing of the condensate 104 prior to reaching the process 112. In embodiments, assist gas source 116 is gas from a downstream or later stage of compression of the compression system 12. As shown in FIG. 2, an overhead line 120 provides communication of the process stream or gas within the drum 86 and to the compressed gas destination 82. An optional return line 122 provides a way of communicating gas with a process stream within line 120 and back to line 72. A control valve is shown within line 122 for controlling the flow of fluid through line 122.

Shown in line 118 is a control valve 124 and that is in operational communication with a pressure controller 126, that in turn is in communication with a pressure transmitter 128 shown downstream of control valve 124, pressure transmitter 128 provides an indication of pressure within line 118 downstream of control valve 124. In the example of FIG. 2, communication link 64 provides communication between the pressure controller 126 and the master controller 62. Further shown in this example, is that the communication link 64 extends to a level transmitter 130 shown mounted onto drum 86 and which monitors a level of condensate 104 within drum 86. Also shown is a telemetry link 132 between the master controller 62 and blowdown system 108 and for controlling operation of blowdown system 108. In a non-limiting example of operation, logics within master controller 62 and/or pressure controller 126 generate and send command signals to actuate control valve 124 to an open, or more open, configuration to allow gas to flow to the blowdown system 108 in response to the level controller 130 sensing designated levels of condensate 104 within drum 86.

Figure 3:
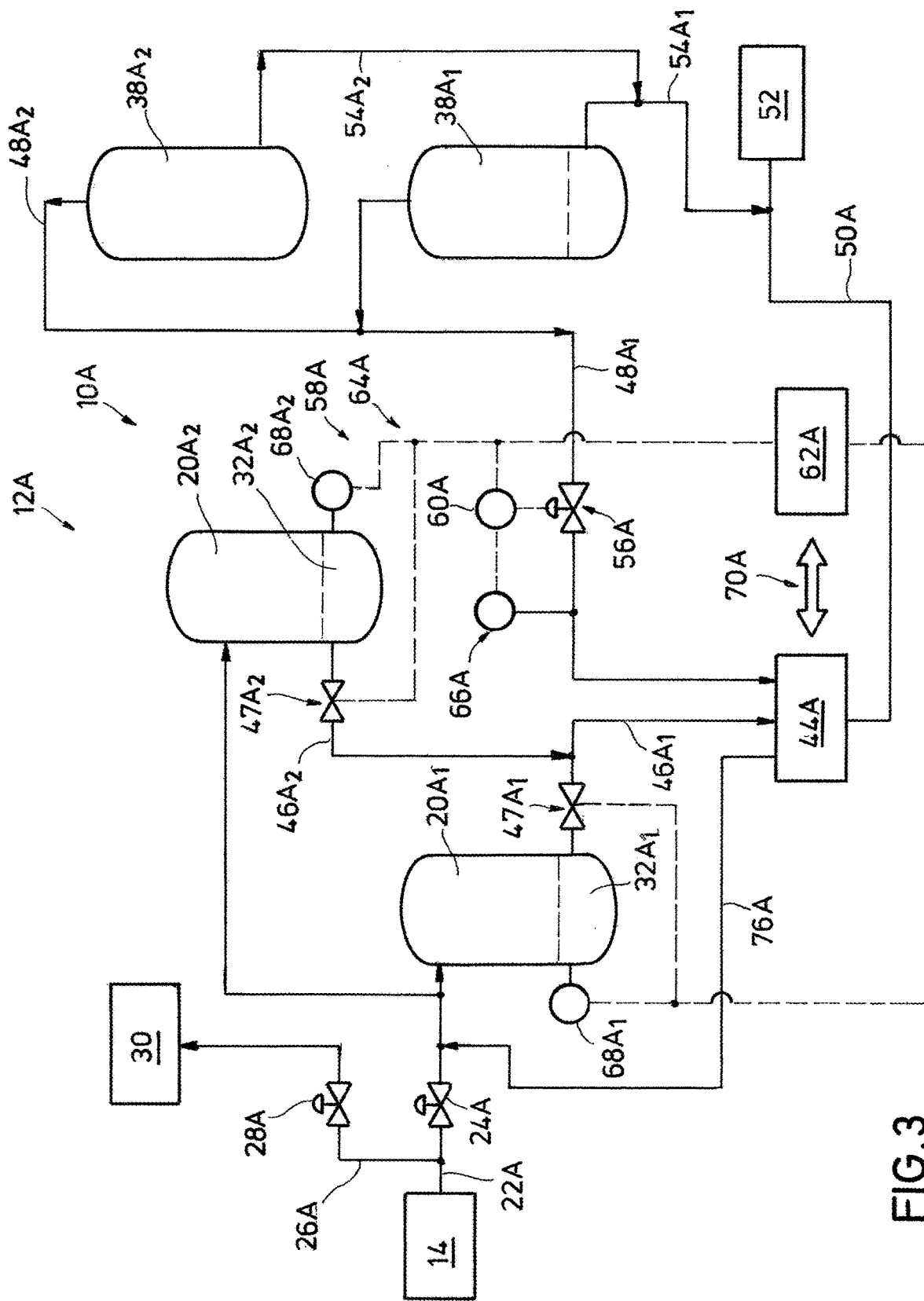
FIG. 3 is a schematic of a stage of a multiple train compression system having an example condensate blowdown system.

Referring now to FIG. 3, shown is an alternate example of compression system 12A and in which the first stage 10A includes a pair of compression trains so that flow of gas from gas source 14 is split to a pair of AC suction KO drums $20A_1$, $20A_2$ that each collect condensate $32A_1$, $32A_2$ in their respective bottom portions. In this example, condensate $32A_1$, $32A_2$ is routed to blowdown system 44A through drain lines $46A_1$, $46A_2$. Optional block valves $47A_1$, $47A_2$ are provided within these lines $46A_1$, $46A_2$ and which selectively maintain a level of condensate $32A_1$, $32A_2$ within the drums $20A_1$, $20A_2$. Operation of these valves $47A_1$, $47A_2$ is respectively controlled by communication with level transmitters $68A_1$, $68A_2$ mounted on the drums $20A_1$, $20A_2$. Similarly, discharge drums $30A_1$, $30A_2$ which are shown downstream of a compressor (not shown) provide gas at a higher pressure than condensate $32A_1$, $32A_2$ through lines $48A_1$, $48A_2$ and to the blowdown system 44A. In the example of FIG. 3, a single control valve 56A is provided within line $48A_1$ and that is controlled by a pressure controller 60A that operates in response to information received from the pressure transmitter 66A as well as level transmitters $68A_1$, $68A_2$ and signals from the master controller 62A. Further shown in the example of FIG. 3 is communication between the blowdown system 44A and master controller 62A is via a telemetry link 70A. In an alternate example, control hardware and software of systems within the blowdown system 44A is contained entirely within blowdown system 44A and separate from the master controller 62A. Similar to the operation of the first stage 10 of FIG. 1, condensate $32A_1$, $32A_2$ is delivered to the condensate destination 52 via line 50A and at a pressure so that the condensate $32A_1$, $32A_2$ in line 50A remains above a saturation pressure. Optionally, condensate from within drums $38A_1$, $38A_2$ flows into the line 50A through lines $54A_1$, $54A_2$ and combines with condensate $32A_1$, $32A_2$ upstream of condensate destination 52.

Figure 4:
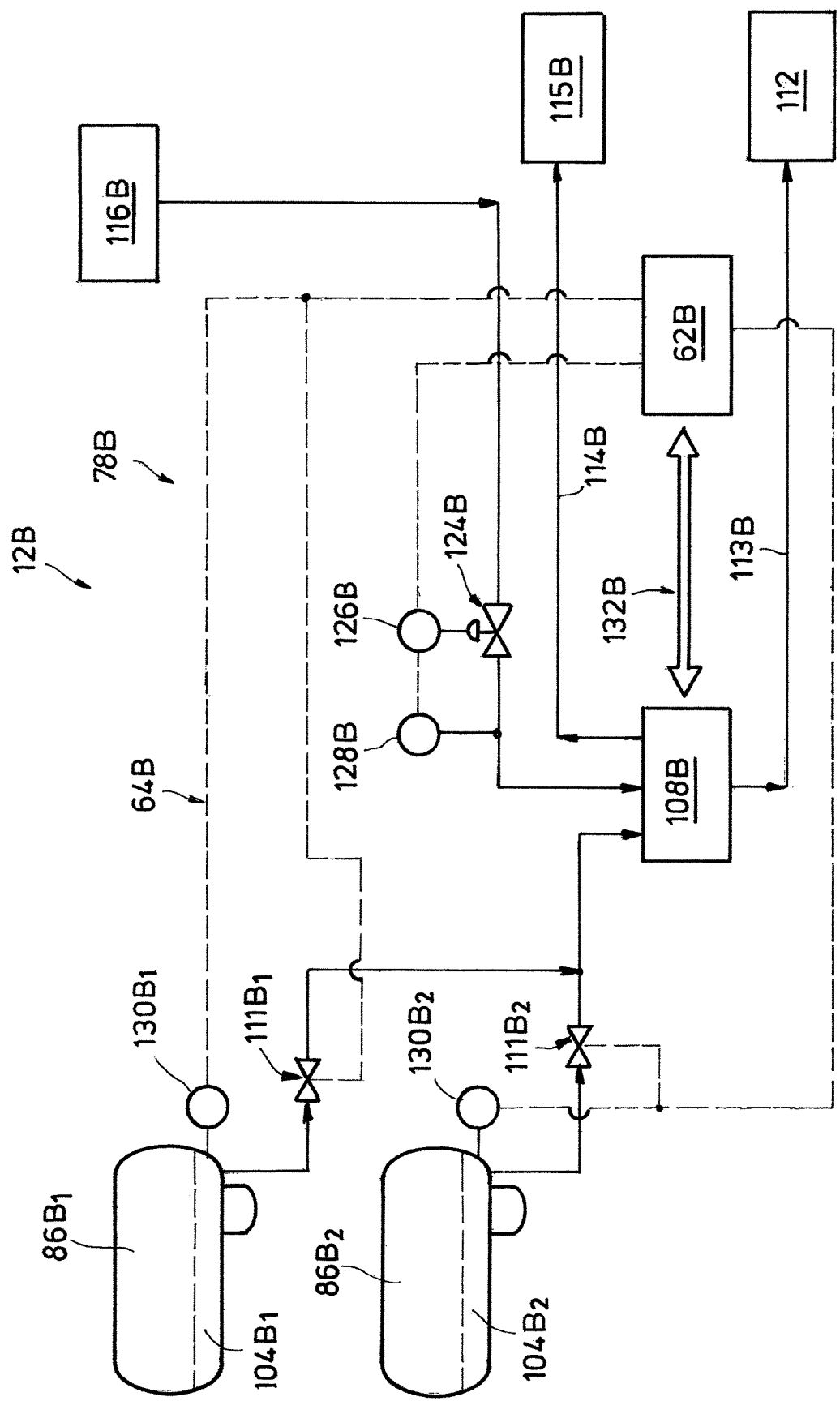
FIG. 4 is a schematic of a later stage of the compression system of FIG. 3 and having an example of a condensate blowdown system.

An example of a second stage 78B is shown in schematic form in FIG. 4 and which includes a pair of compressor trains piped in parallel that include compressor discharge knockout drums $86B_1$, $86B_2$ which each have an amount of hydrocarbon condensate $104B_1$, $104B_2$ collecting in the lower portion of their inner spaces. Condensate $104B_1$, $104B_2$ is shown selectively being routed to blowdown system 108B via lines $110B_1$, $110B_2$. Similar to the example of FIG. 2, block valves $111B_1$, $111B_2$ are in communication with level transmitters $130B_1$, $130B_2$ mounted to drums $86B_1$, $86B_2$, and depending upon the sensed level of condensate $104B_1$, $104B_2$ within drums $86B_1$, $86B_2$ control the amount of condensate $104B_1$, $104B_2$ flowing through lines $110B_1$, $110B_2$. Level transmitters $130B_1$, $130B_2$ are shown in communication with master controller 62B via the communication link 64B, and which provides controlling signal commands to the pressure controller 126B for regulating control valve 124B to control a particular amount of assist gas from gas source 116B to the blowdown system 108B. Pressurized condensate flows from the blowdown system 108B and to condensate process 112 via line 113B. In this example, a lower stage 115B is illustrated which receives gas via line 114B from the blowdown system 108B. In the example, in the early stage or lower stage 115B is a portion of the compression system 12B at a lower pressure or an earlier stage than the second stage 78B.

Figure 5:
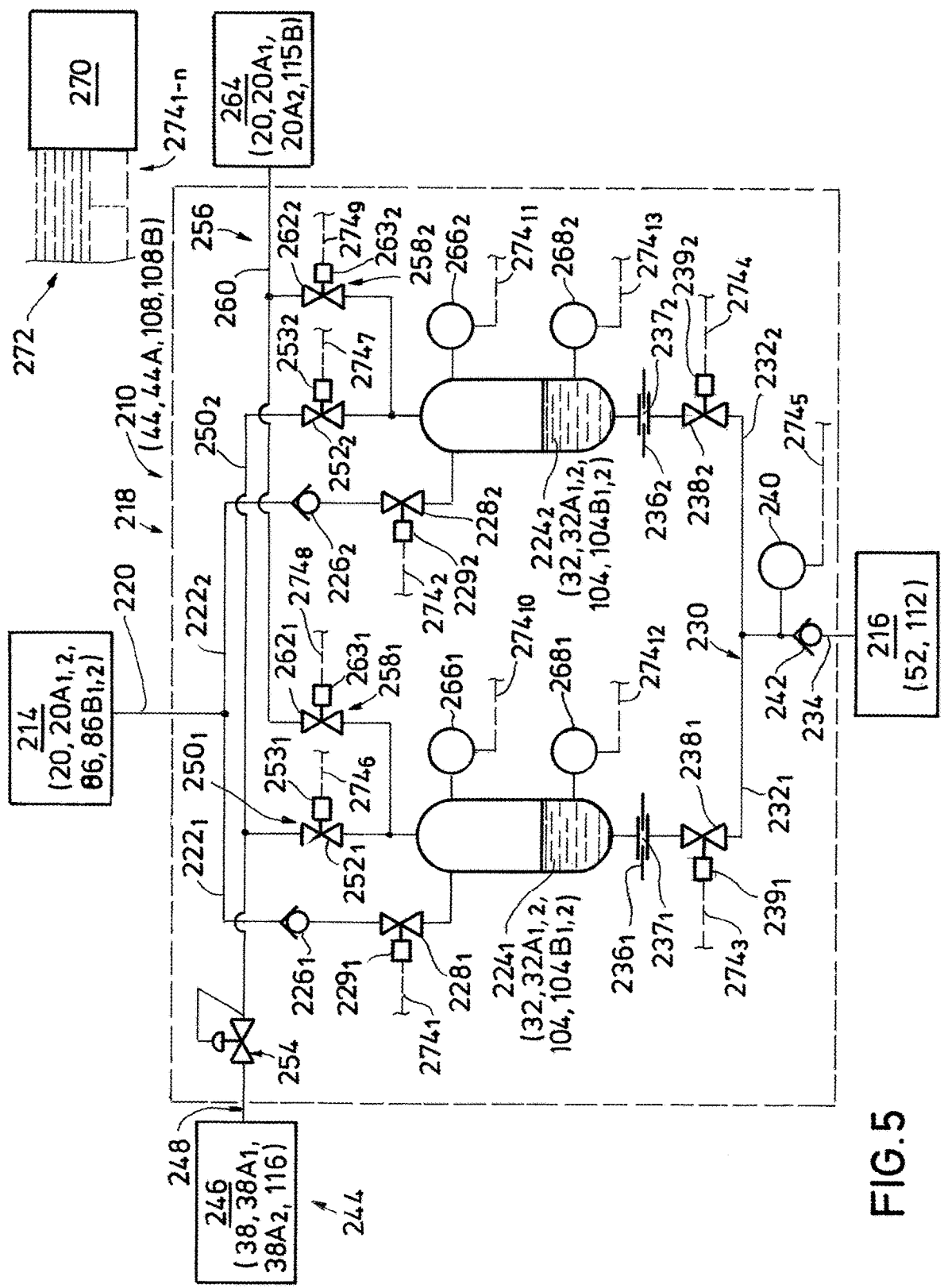
FIG. 5 is a schematic example of a condensate blowdown system for use with the compression systems of FIGS. 1-4.

Shown in schematic form in FIG. 5 is one example of a blowdown system 210, which for the purposes of brevity represents an example of blowdown systems 44, 44A, 108, 108B of FIGS. 1-4. Further in this example, blowdown system 210 receives condensate from a condensate source 214, which in alternatives represents one or more of drum 20, $20A_{1,2}$, 86, $86B_{1,2}$. Inside blowdown system 210 condensate is pressurized and directed to a condensate destination 216, which in alternatives represents one or more of condensate destination 52 and condensate process 112. Examples of the condensate destination 216 further include processing facilities (not shown), such as plants for synthesizing chemicals, or those that isolate components of feed stock, such as refineries. The blowdown system 210 of FIG. 5 includes a condensate inlet circuit 218 shown having condensate inlet line 220 and condensate inlet leads $222_1$, $222_2$ that extend from an end of the condensate inlet line 220. The illustrated example of the inlet line 220 has one end in communication with the condensate from condensate source 214 and an opposite end in communication with the leads $222_1$, $222_2$. The leads $222_1$, $222_2$ of this example have ends distal from the inlet line 220 that respectfully connect to vessels $224_1$, $224_2$, and in which the condensate is transported from the condensate source 214 to the vessels $224_1$, $224_2$. Optional check valves $226_1$, $226_2$ are provided within inlet leads $222_1$, $222_2$. The check vales $226_1$, $226_2$ block flow from vessels $224_1$, $224_2$ back to inlet line 220, while allowing flow in a direction from inlet line 220 and into vessels $224_1$, $224_2$. Condensate inlet valves $228_1$, $228_2$ are provided respectively in the inlet leads $222_1$, $222_2$ and which in an example are selectively opened or closed to thereby control the inflow of the condensate into the vessels $224_1$, $224_2$.

Motors $229_1$, $229_2$ are optionally provided that generate an actuating force for opening and closing valves $228_1$, $228_2$. A discharge circuit 230 is included in the example of FIG. 5, and shown being made up of piping for transferring the condensate from vessels $224_1$, $224_2$ and into the condensate destination 216. Discharge leads $232_1$, $232_2$ are included with the illustrated discharge circuit 230, and which have ends connected respectively to outlet ports of vessels $224_1$, $224_2$ and opposite ends that terminate at a discharge line 234. Discharge leads $232_1$, $232_2$ provide selective communication between vessels $224_1$, $224_2$ and discharge line 234. An end of discharge line 234 opposite the discharge leads $232_1$, $232_2$ couples with the condensate destination 216. In the illustrated example, orifice members $236_1$, $236_2$ are respectively disposed in discharge leads $232_1$, $232_2$. In the example of FIG. 5, the orifice members $236_1$, $236_2$ are generally planar and have openings $237_1$, $237_2$ formed there through that are strategically sized to meter a designated amount of the condensate through discharge leads $232_1$, $232_2$ and onto the condensate destination 216. In one embodiment the openings $237_1$, $237_2$ have cross sectional areas that are less than cross sectional areas in the discharge leads $232_1$, $232_2$. Examples exist where the designated amount is an amount of flow per time, such as mass or weight per time of the condensate (for example, kilograms per hour ["kg/hr"]), or a volume of the condensate per time (for example, cubic meters/hour ["$m^3$/hr"]). Optionally, the designated amount is a total mass, weight, or volume of the condensate. It is well within the capabilities of those skilled in the art to provide orifice members $236_1$, $236_2$ with openings $237_1$, $237_2$ of a size to achieve a designated amount of flow of the condensate into the condensate destination 216. In an alternative, control valves are used in place of the orifice members $236_1$, $236_2$ to regulate the amount of flow of the condensate. Embodiments of the alternative control valves include ball valves or gate valves with openings selectively adjusted to varying cross sectional areas. Condensate outlet valves $238_1$, $238_2$ are shown disposed within the leads $232_1$, $232_2$, and which selectively allow or block flow through leads $232_1$, $232_2$ when opened or closed by energizing valve motors 2391, 2392. Further in the illustrated example is an optional flow indicator 240 that is in communication with discharge line 234, and that monitors the amount of condensate within outlet line 234. In an alternative a check valve 242 is included within outlet line 234 to ensure that flow direction is restricted to direct the flow from the vessels $224_1$, $224_2$ to the condensate destination 216 and not from the condensate destination 216 and back to vessels $224_1$, $224_2$.

Still referring to FIG. 5 the example of the blowdown system 210 further includes a blowdown pressure circuit 244 that selectively pressurizes vessels $224_1$, $224_2$ to a specified pressure. Pressurizing vessels $224_1$, $224_2$ to a specified value provides sufficient energy to drive the condensate to the condensate destination 216, and at a pressure to prevent or minimize flashing of the condensate. In an example, the specified value of the pressure is greater than a saturation pressure of the condensate by an amount that is at least as great as the dynamic and static pressure losses encountered by the condensate while flowing between the blowdown system 210 and condensate destination. Included within the blowdown pressure circuit 244 is a blowdown pressure source 246. Examples of a pressure source 246 include a flow line having pressurized fluid, a tank having pressurized fluid, a compressor, a pump, or any other known or later developed means or device for providing a pressurized fluid. Examples of pressurized fluid include any gas or vapor, such as air or nitrogen. As described in further detail, the magnitude of the pressure is that which is sufficient to drive the designated amount of flow of the condensate to and into the condensate destination 216. Further illustrated in this example is a discharge of the blowdown pressure source 246 connected to a blowdown pressure inlet line 248, that in combination with blowdown pressure inlet leads $250_1$, $250_2$, selectively communicate the pressurized fluid from the blowdown pressure source 246 to the vessels $224_1$, $224_2$. In an embodiment, a blowdown pressure inlet valve $252_2$ is included within blowdown pressure inlet line 248 between vessel $224_2$ and a pressure control valve 254. Blowdown pressure inlet valve $252_2$ is selectively opened and closed to block or allow communication between pressure control valve 254 and vessel. $224_2$. The pressure control valve 254 is configured so that its downstream side, and thus blowdown pressure inlet leads $250_1$, $250_2$ are maintained at a certain pressure, so that the combination of pressure within vessels $224_1$, $224_2$ and the cross sectional area in the openings $237_1$, $237_2$ or orifice members $236_1$, $236_2$ delivers the condensate into the condensate destination 216 at a pressure that is substantially the same as a designated pressure. Similarly, valve motors $253_1$, $253_2$ are shown coupled to blowdown pressure inlet valves $252_1$, $252_2$ and which actuate the valves $252_1$, $252_2$ selectively into open and closed position. In an example, the pressure and/or rate of condensate delivered to the condensate destination 216 is changed by adjusting the pressure control valve 254 to alter fluid pressure downstream of the pressure control valve 254 and thus the one or both of the vessels $224_1$, $224_2$ dispensing the condensate.

In an alternative, blowdown system 210 includes a pressure discharge circuit 256 shown having pressure discharge leads $258_1$, $258_2$ whose ends are in fluid communication respectively with vessels $224_1$, $224_2$. In the illustrated example, the pressure discharge leads $258_1$, $258_2$ physically connect to blowdown pressure inlet leads $250_1$, $250_2$, however, the pressure discharge leads $258_1$, $258_2$ may alternatively be coupled directly onto vessels $224_1$, $224_2$. Ends of the pressure discharge leads $258_1$, $258_2$ distal from the blowdown pressure inlet leads $250_1$, $250_2$ terminate into a pressure discharge line 260. Discharge valves $262_1$, $262_2$ are shown integrally disposed within pressure discharge leads $258_1$, $258_2$. Valve motors $263_1$, $263_2$ selectively open and close valves $262_1$, $262_2$ to thereby allow or block pressure communication through leads $258_1$, $258_2$. An end of pressure discharge line 260 distal from discharge valves $262_1$, $262_2$ terminates at a recycle/recovery system 264. In an alternative, recycle/recovery system 264 represents one or more of drums 20, $20A_{1,2}$ and lower pressure stage 115B.

Pressure indicators $266_1$, $266_2$ are illustrated respectively coupled onto vessels $224_1$, $224_2$, that provide an indication of pressure within vessels $224_1$, $224_2$ and that optionally generate a signal representative of a pressure sensed within the vessels $224_1$, $224_2$. Level indicators $268_1$, $268_2$ are also depicted in the illustrated example, that in an alternative detect a level of condensate 32, $32A_{1,2}$, 104, $104B_{1,2}$ disposed within vessels 241, 242, and optionally transmit signals representative of the monitored level. Further schematically illustrated is an example of a controller 270 which in an embodiment is in communication with various components in portions of the blowdown system 210 via a communication means 272. In an alternative, controller 270 includes an information handling system that optionally encompasses a processor, memory accessible by the processor, nonvolatile storage area accessible by the processor, and logics for performing each of the steps described. In alternatives, controller 270 is a part of or operates in conjunction with master controller 62 (FIG. 1). In the illustrated example, the communication means 272 includes a number of signal lines 2741, which can be hard wired, wireless telemetry, pneumatic, and other forms of communication between operations hardware, and combinations thereof. In an example, "1-n" represents "1 through n."

In a non-limiting example of operation of blowdown system 210 of FIG. 5, operational phases of the vessels $224_{1,2}$ include (1) delivering condensate to one of the vessels $224_{1,2}$ from condensate source 214; (2) pressurizing the one of the vessels $224_{1,2}$ from step (1) with compressed gas from the blowdown pressure source 246; (3) directing condensate from the one of the vessels $224_{1,2}$ of step (2) to the condensate destination; (4) depressurizing the one of the vessels $224_{1,2}$ of step (3) by venting the compressed gas to the recycle/recovery system 264; and (5) repeating steps (1)-(4). In an alternative, the operational phases of the vessels $224_{1,2}$ are offset from one another. An example of operating the system 210 of FIG. 5 is provided in Ansari et al., U.S. Pat. No. 10,671,099 ("Ansari et al. '099"), which is incorporated by reference herein in its entirety. Ansari et al. '099 and the present application share the same assignee. An advantage of the method and system described is that the need for pumps to inject the condensate is eliminated; accordingly, implementation of the present system increases the reliability of a condensate blowdown and at a reduced cost.

In a non-limiting example of operation of the system 12 of FIGS. 1 and 5 and in which details of blowdown system 44 of FIG. 1 are provided within blowdown system 210 of FIG. 5, master control of 62 is in communication with controller 270 such as through the telemetry link 70 shown in FIG. 1. In this example, master controller 62 receives a signal from level indicator 68 indicating a high liquid level of liquid condensate 32 within drum 20. At a designated level of the condensate 32 detected or sensed within drum 20 by level transmitter 68, master controller 62 is configured to generate and send a signal to controller 270 to initiate operation of valves $228_{1,2}$, $238_{1,2}$, $252_{1,2}$, 254, $262_{1,2}$ within the condensate blowdown system 210. Further in this example, a signal from master controller 62 is delivered to control valve 56 to by communication of gas within line 55 to make its way to the blowdown system 44, the pressurized gas provides a motive force that urges condensate 32 from within vessels $224_1$, $224_2$ and to the condensate destinations 216, 52, 112. Similarly, level transmitter 68 also senses low levels of condensate 32 within drum 20 that in turn the controller 62 is configured to deliver signals to close control valve 56 and suspend the flow of gas into the blowdown system 44. In examples when the level of condensate 32 within drum 20 continues to increase when condensate is being drawn through lien 46 and out of drum 120, commands from master controller 62 are delivered to controller 270 to increase the rate of condensate draw-off from vessels $224_1$, $224_2$, such as by increasing the open area of control valve 56 to deliver a greater flow of assist gas and at a greater pressure for increasing the flow of condensate 32 from within the blowdown system 44. A low level indicator is included with the level transmitter 68 and for issuing signals for adjusting the open value of control valve 56 and to reduce the rate of the condensate 32 being discharged from the blowdown system 44. Further included with the example of operation is that when a low-low level of condensate 32 is detected within drum 20, control valve 56 is closed via commands from master controller 62. It is within the capabilities of one skilled in the art to designate liquid levels in a vessel (such as but not limited to high, high-high, low, and low-low) and generate an operational control procedure in response to the(se) detected liquid level(s).

Referring now to FIGS. 2 and 5, and in which in this example details of blowdown system 108 are represented as the blowdown system 210 of FIG. 5. In this example, operation of control valve 124 is variable depending upon signals received from level transmitter 130, and in situations where the level of condensate 104 is at or above a designated level, such as a high liquid level, signals are generated within master controller and transmitted to pressure controller 126 for configuring control valve 124 into an open position for allowing a flow of gas from assist gas source 116 to the blowdown system 108 and that is delivered to vessels $224_1$, $224_2$ shown in FIG. 5 for providing a motive force to drive the condensate 104 from blowdown system 108 and to the condensate process 112. Similar to the operation of FIG. 1, when gas is being provided through control valve 124 to the blowdown system 108, and the level of condensate 104 is increasing within drum 86, commands are generated by master controller 62, and which are optionally transmitted via communication link 132 to the blowdown system 108, which provide a greater flow of the assist gas to blowdown system 108. In this example, control valve 124 is configured to have a larger cross-sectional opening to allow a greater amount of assist gas through line 118. Conversely, when low levels of condensate 104 are sensed within drum 86 by level transmitter 130, signals are generated within master controller 62 and delivered to the pressure controller 126 via communication link 64 for directing the control valve 124 into a lower flow configuration and which reduces the amount of pressurized condensate flowing from the blowdown system 108. Provisions also exist in this example for totally closing control valve 124 when a flow of condensate 104 from within drum 86 is not required.

Examples of operation of the multiple train embodiments of FIGS. 3 and 4 in combination with FIG. 5 are discussed as follows. An example when drums $20A_1$, $20A_2$, and drums $86B_1$, $86B_2$ each experience a normal level of condensate that is not rising, the respective block valves $47A_1$, $47A_2$, $111A_1$, $111B_2$ from each of these drums and flowing to the blowdown systems 44A, 108B are closed, as well as control valves 56A, 124B that regulate assist gas flowing from higher pressure regions of the compression system to the blowdown systems 44A, 108B. In situations when drums $20A_1$, $20A_2$, and drums $86B_1$, $86B_2$ of either train of FIG. 3 or 4 experience a high liquid level, liquid draw-off is initiated by opening at least one of the block valves $47A_1$, $47A_2$, $111A_1$, $111B_2$ that regulate flow of condensate from the drums $20A_1$, $20A_2$, and drums $86B_1$, $86B_2$ to the respective blowdown systems 44A, 108B. When one of the drums $20A_1$, $20A_2$, and drums $86B_1$, $86B_2$ of either train is detected having a high liquid level the liquid draw-off rate is increased at a high rate of set point and the controller 62, 62A, 62B which increases the amount of assist gas flowing to the blowdown systems 44A, 108B. Conversely, when one of the trains has a drum $20A_1$, $20A_2$, $86B_1$, $86B_2$ at a normal liquid level and the other train of that system has a drum $20A_1$, $20A_2$, $86B_1$, $86B_2$ at a low liquid level, liquid draw off is suspended, the block valves $47A_1$, $47A_2$, $111A_1$, $111B_2$ are closed as well as the control valve 56A, 124B providing assist gas to the blowdown system. When embodiments of either FIG. 3 or FIG. 4 has both trains that are at a high liquid level the draw off liquid rate is increased and the block valves $47A_1$, $47A_2$, $111A_1$, $111B_2$ between the drums $20A_1$, $20A_2$, $86B_1$, $86B_2$ and blowdown systems 44A, 108B are all moved to an open position. Also in situations when one of the trains of either FIG. 3 or 4 has a drum $20A_1$, $20A_2$, $86B_1$, $86B_2$ with a high, high liquid level and the other train at a high level liquid, draw-off is increased to a high, high rate and the pressure controller 60A, 124B (or master controller 62A, 62B) is set at a highest set point for drawing liquid condensate from the system. In situations when a drum $20A_1$, $20A_2$, $86B_1$, $86B_2$ of either train is operating with a low liquid level while the other drum $20A_1$, $20A_2$, $86B_1$, $86B_2$ is at a high liquid level, the block valve $47A_1$, $47A_2$, $111A_1$, $111B_2$ connecting the drum $20A_1$, $20A_2$, $86B_1$, $86B_2$ with the low liquid level to the blow down 44A, 108A system is put in a closed position and the draw-off rate for the drum $20A_1$, $20A_2$, $86B_1$, $86B_2$ of the high liquid level is reduced by one increment (i.e. from high-high to high etc.).

The methods and systems of the present disclosure, therefore, are well adapted to carry out the objects and attain the ends and advantages mentioned, as well as others inherent. While a presently preferred embodiment of the method and system has been given for purposes of disclosure, numerous changes exist in the details of procedures for accomplishing the desired results. For example, the vessels, valves, and associated instrumentation can all be mounted onto a single skid unit. Furthermore, it should be pointed out, that while a pair of vessels $224_1$, $224_2$ is illustrated in the figures, a single vessel can be used where there flow of condensate is regulated across an orifice 236, and alternate embodiments include more than two vessels. In the alternate embodiments having a plurality of vessels, the number of inlet leads, outlet leads, and orifices corresponds to the number of vessels. In an embodiment, a single vessel embodiment can be used for batch processing, whereas multi-vessel embodiments are used in continuous condensate blowdown. In another alternative, condensate is dispensed from both vessels $224_1$, $224_2$ at the same time. These and other similar modifications will readily suggest themselves to those skilled in the art, and are intended to be encompassed within the spirit of the present disclosure and the scope of the appended claims.

What is claimed is:
1. A method of operating a compressor system having multiple stages of compression, the method comprising:
 a. receiving condensate collected from a first area in the compressor system that is at a first pressure;
 b. directing the condensate to a blowdown system;

c. obtaining gas from a vessel in the second area in the compressor system that is downstream of the first area and at a second pressure, which is greater than the first pressure;

d. forming pressurized condensate in the blowdown system that is at a designated pressure by combining the gas from the second area at the second pressure with the condensate in the blowdown system that is at the first pressure; and e. flowing the pressurized condensate from the blowdown system to a condensate destination.

2. The method of claim 1, wherein the blowdown system comprises vessels in which the condensate is pressurized and then flows from the vessels to the condensate destination, the method further comprising depressurizing the vessels after the condensate flows from the vessels.

3. The method of claim 2, wherein depressurizing the vessels comprises flowing the gas from the vessels to the first area.

4. The method of claim 2, wherein depressurizing the vessels comprises flowing the gas from the vessels to one or more of stages of compression between the first area and the second area.

5. The method of claim 2, wherein depressurizing the vessels comprises flowing the gas from the vessels to a stage that is upstream of the first area.

6. The method of claim 2, wherein operational phases of vessels are staggered, so that while one of the vessels is receiving condensate, condensate is flowing from another one of the vessels and so that pressurized condensate flow to the condensate destination is substantially continuous.

7. The method of claim 1, wherein the designated pressure exceeds a saturation pressure of the condensate by an amount at least as great as dynamic and static pressure losses experienced by the condensate when flowing from the vessel to the condensate destination.

8. The method of claim 1, further comprising combining condensate from the second area of compression with the pressurized condensate at a location upstream of the condensate destination.

9. The method of claim 1, wherein the first area comprises a first knockout drum disposed upstream of a first compressor, and wherein the second area comprises a second knockout drum disposed downstream of the first compressor.

10. The method of claim 1, further comprising collecting hydrocarbon condensate from a third area in the compression system, and wherein the hydrocarbon condensate collected from the third area comprises hydrocarbons from a process stream being pressurized in the multiple stages of compression.

11. The method of claim 10, wherein the blowdown system comprises a first blowdown system, the method further comprising directing the hydrocarbon condensate to a second blowdown system, forming pressurized hydrocarbon condensate by directing gas to the second blowdown system that is from a stage in the compressor system having a pressure greater than the third area.

12. The method of claim 11, further comprising directing gas from the second blowdown system to the first area.

13. The method of claim 10, further comprising separating water condensate from the hydrocarbon condensate, and directing the water condensate to a water condensate destination.

14. The method of claim 11, further comprising collecting an additional amount of water condensate from a suction line of a compressor upstream of the third area, and combining the water condensate with the additional amount of water condensate at a location upstream of the water condensate destination.

15. A method of operating a compressor system having multiple stages of compression, the method comprising:
directing condensate collected from an early stage of the compressor system to a blowdown system;
pressurizing the condensate in the blowdown system with gas from a later stage of the compressor system and that is at a pressure that is substantially the same as the later stage of the compressor system; and
flowing the pressurized condensate from the blowdown system to a condensate destination.

16. The method of claim 15, further comprising flowing the gas to the early stage.

17. The method of claim 15, wherein the blowdown system comprises first and second vessels piped in parallel, the method further comprising: (a) venting gas from the first vessel, flowing the condensate into the first vessel, and pressurizing the first vessel with the gas while condensate is flowing from the second vessel, (b) venting gas from the second vessel, flowing the condensate into the second vessel, and pressurizing the second vessel with the gas while condensate is flowing from the first vessel, and (c) repeating steps (a) and (b) so that a flow of condensate to the condensate destination is substantially continuous.

18. The method of claim 15, wherein the condensate is pressurized to a designated pressure so that the condensate remains in the liquid state while flowing to the condensate destination.

19. The method of claim 15, further comprising flowing gas from a downstream blowdown system to the early stage.

20. The method of claim 19, wherein hydrocarbon condensate is directed to the downstream blowdown system.

* * * * *